United States Patent [19]

Yoshino et al.

[11] 3,978,284

[45] Aug. 31, 1976

[54] RECEIVER FOR USE IN A MULTI-LEVEL CODE TRANSMISSION SYSTEM

[75] Inventors: Takehiko Yoshino; Katsuo Mohri, both of Yokohama, Japan

[73] Assignees: Nippon Hoso Kyokai; Hitachi, Ltd., both of Tokyo, Japan

[22] Filed: Feb. 1, 1974

[21] Appl. No.: 438,680

[30] Foreign Application Priority Data

Feb. 9, 1973  Japan.............................. 48-16199

[52] U.S. Cl. .................... 178/69.5 R; 178/7.3 DC; 325/38 A
[51] Int. Cl.² ........................................ H04B 1/00
[58] Field of Search............... 178/69.5 R, 69.5 TV, 178/7.3 DC, 7.5 DC, 68, DIG. 23; 325/38 A; 179/170 R

[56] References Cited
UNITED STATES PATENTS

| | | | |
|---|---|---|---|
| 3,579,123 | 5/1971 | Koga ............................ | 178/7.3 DC |
| 3,619,648 | 11/1971 | Wolber........................ | 178/7.5 DC |
| 3,731,199 | 5/1973 | Tazaki et al. ................ | 325/38 A |
| 3,733,550 | 5/1973 | Tazaki et al. ................ | 325/38 A |
| 3,813,483 | 5/1974 | Kurosawa et al. .......... | 178/DIG. 23 |

*Primary Examiner*—Malcolm A. Morrison
*Assistant Examiner*—Errol A. Krass
*Attorney, Agent, or Firm*—Stevens, Avis, Miller & Mosher

[57] ABSTRACT

A multi-level code transmission system for restoring the d.c. component of a received signal by peak-clamping of the peak of the received synchronizing signal to a fixed level so as to establish the synchronization of a receiving end prior to an establishment of synchronization at the receiving end and for effecting pulse-clamping of the reference level of a following received signal after the establishment of synchronization at the timing of a clamping pulse relating to the synchronizing signal. In the case of transmitting a multi-level code signal such as an audio PCM signal together with an analogue signal such as a picture signal alternately, for example in a still picture transmission system, the d.c. level of the received signal is varied due to the low cutoff frequency characteristic of the transmission line, the result of which is the occurrence of a code error in a reproduced code signal at the receiving end. In order to obviate such a code error, the present invention uses two kinds of clamping, i.e., peak-clamping and pulse-clamping before and after the establishment of synchronization at the receiving end, respectively. According to this invention, the multi-level code signal can be reproduced with high fidelity.

9 Claims, 15 Drawing Figures

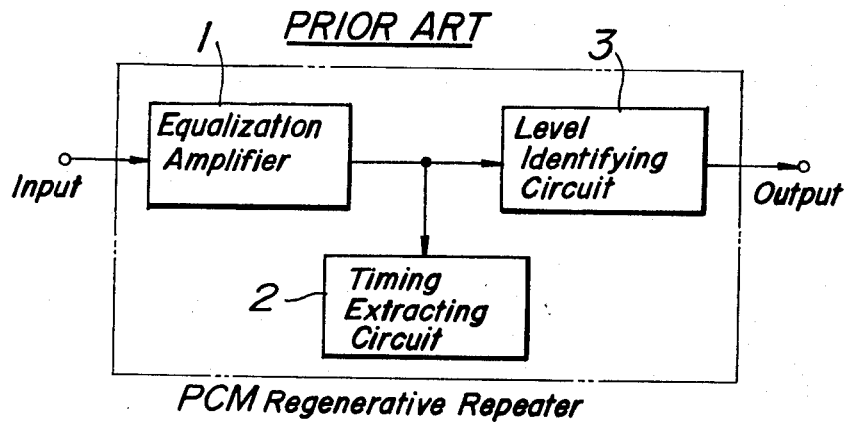
FIG_1 PRIOR ART
PCM Regenerative Repeater
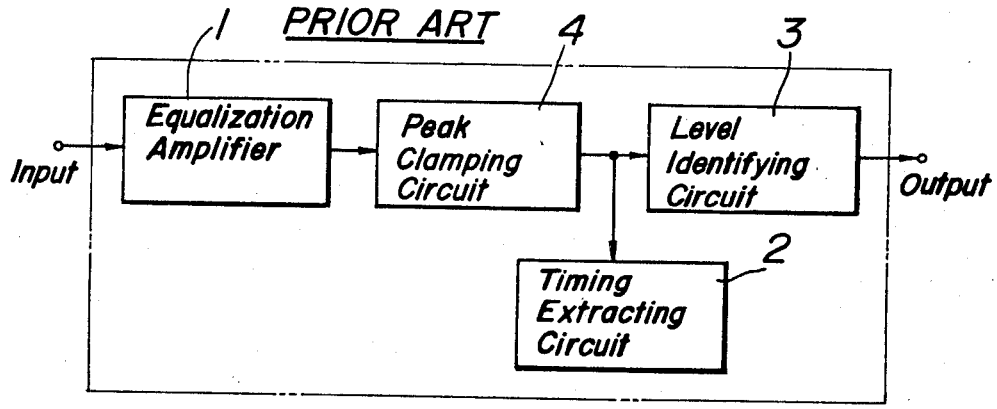
FIG_2 PRIOR ART
PCM Regenerative Repeater
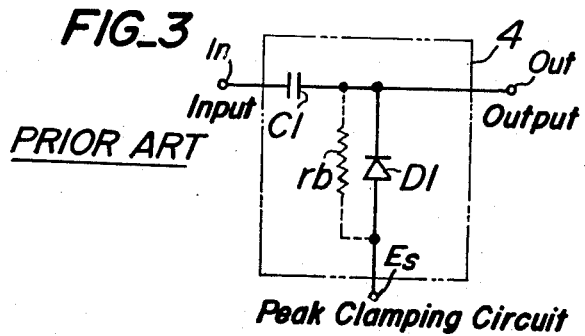
FIG_3 PRIOR ART
Peak Clamping Circuit

FIG_4a  PRIOR ART
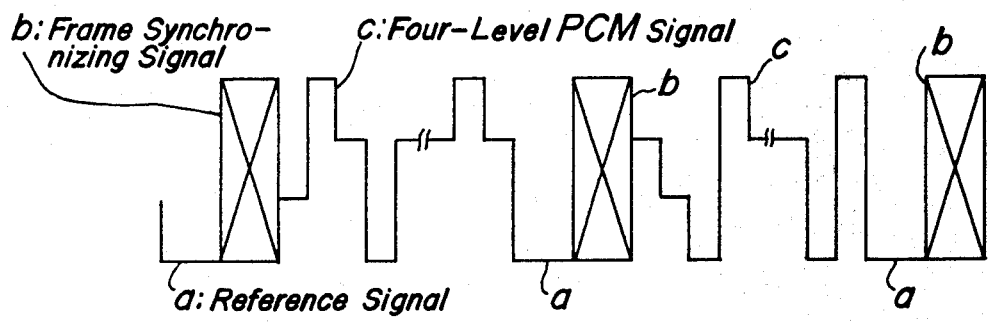
FIG_4b
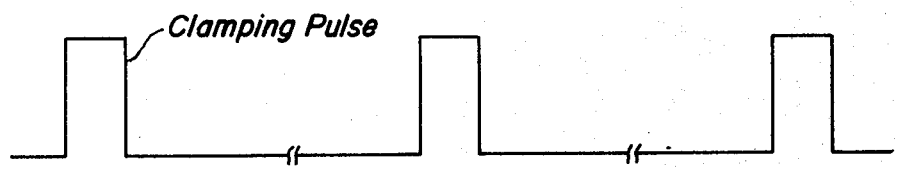
FIG_5
PRIOR ART
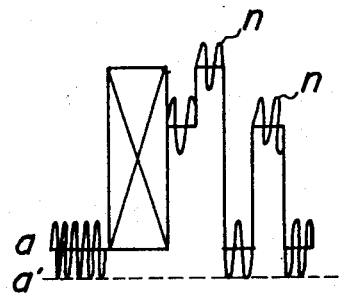

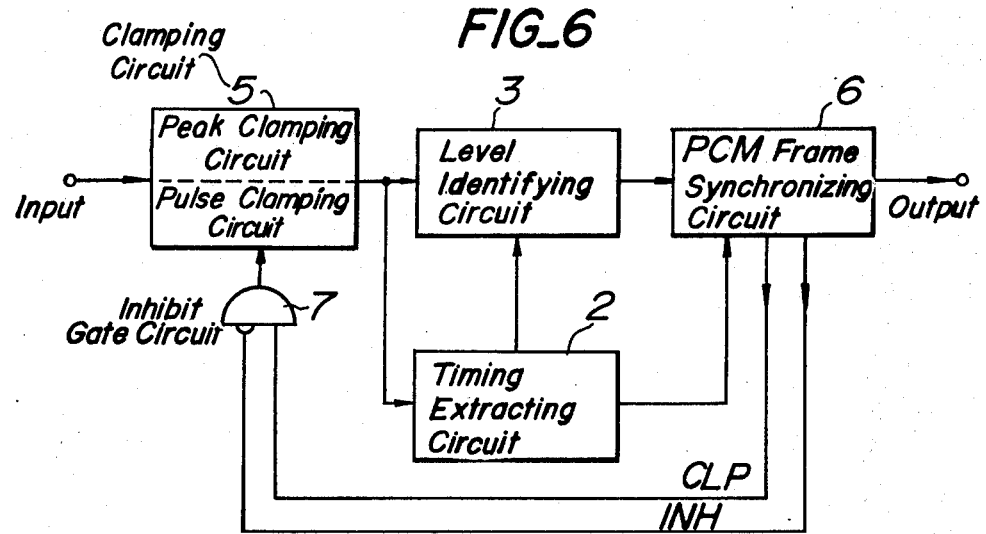
FIG_6
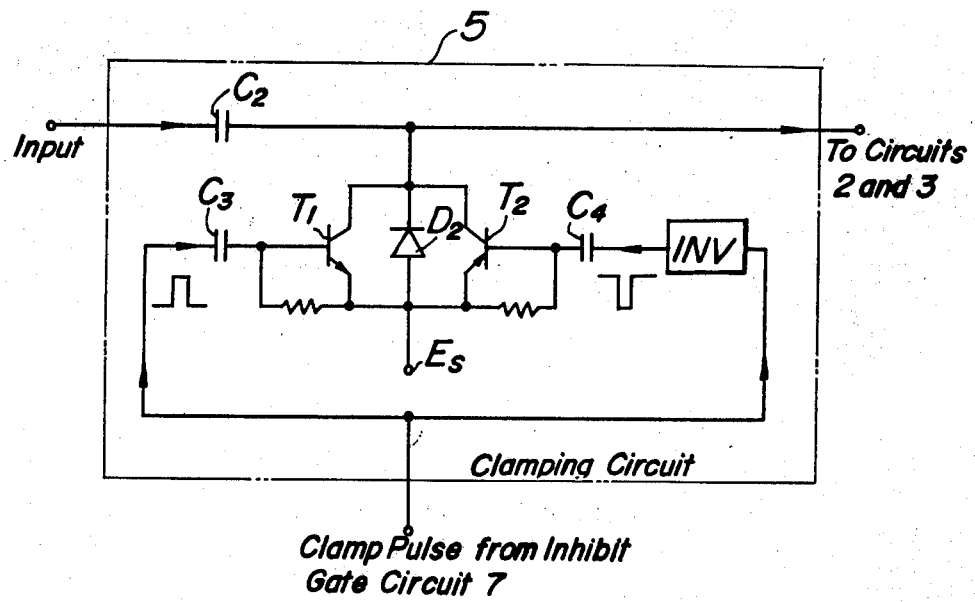
FIG_7

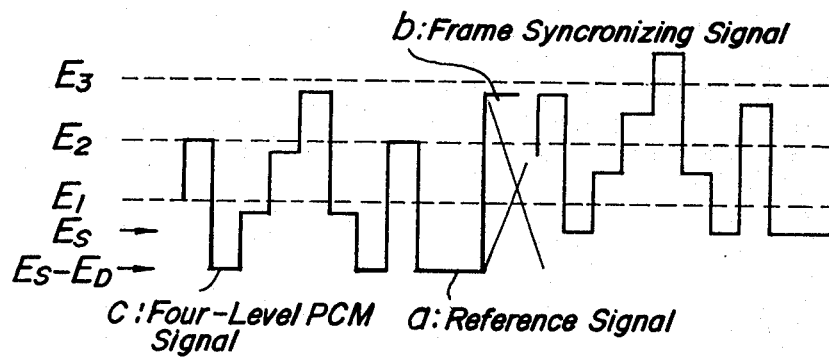
FIG_8a  FIG_8b
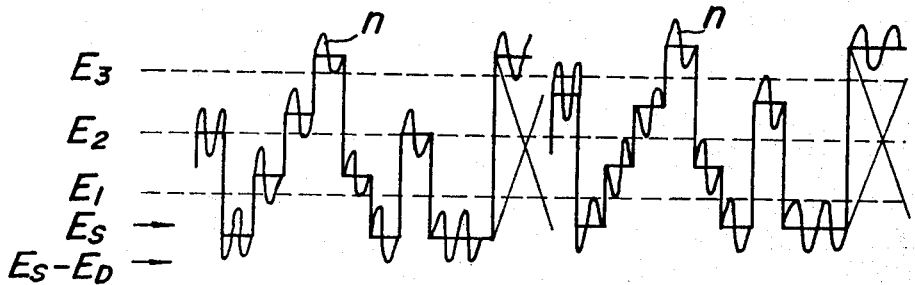
FIG_8c  FIG_8d

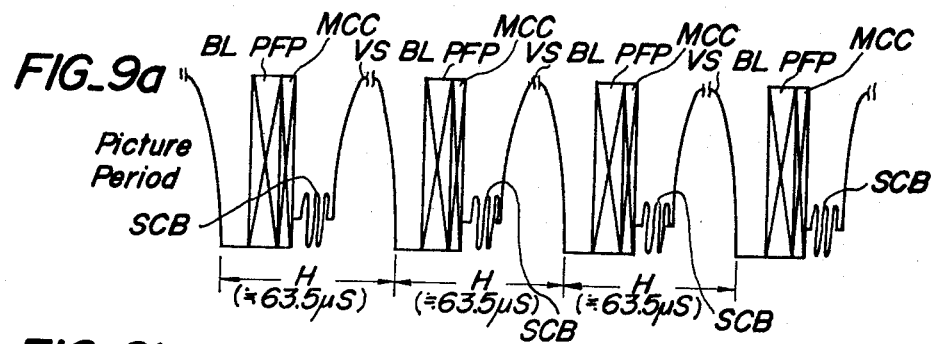
*FIG_9a*
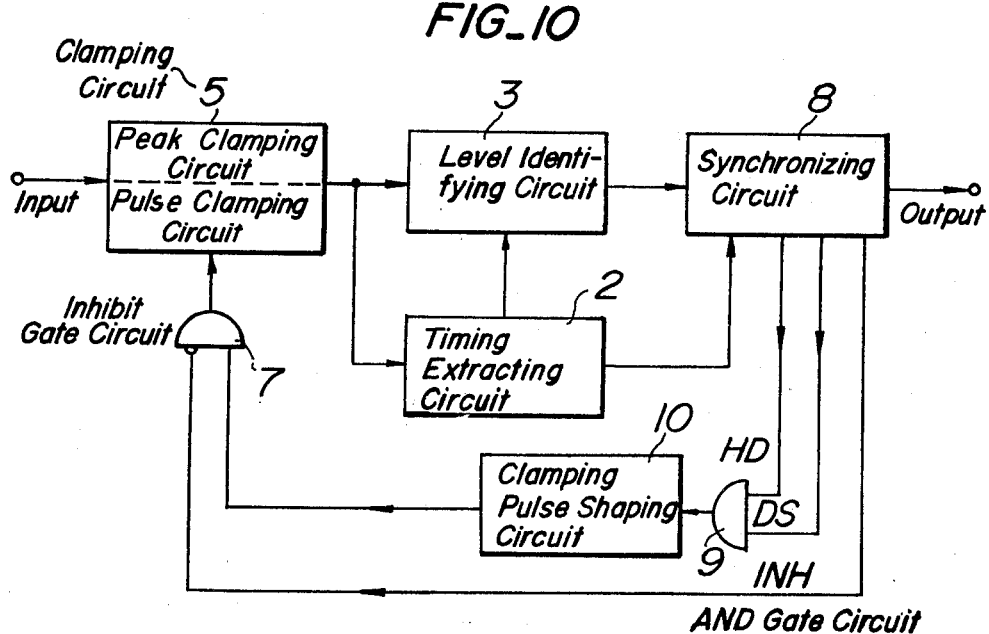
*FIG_9b*
*FIG_10*

RECEIVER FOR USE IN A MULTI-LEVEL CODE TRANSMISSION SYSTEM

BACKGROUND OF THE INVENTION

This invention relates to a multi-level code transmission system for transmitting multi-level PCM signals with high fidelity and more particularly relates to a novel and improved code transmission system wherein a d.c. restoration can be effected in such a way that levels of the transmitted code signals can be reproduced with high fidelity when receiving the transmitted multi-level PCM signals.

In code communication employing such a code signal as PCM signal, there is a problem of code error due to the frequency characteristic of the transmission line. That is, if the transmission line has a low cut-off frequency characteristic, a phase distortion occurs in the low frequency component of the transmitted signal, so that the level of the transmitted code signal is varied with a relative long period through the transmission line by the low cut-off frequency characteristic thereof, and accordingly there occurs code error at the receiving end.

In conventional PCM communication, PCM regenerative repeaters are inserted at every given distance between the transmitting end and the receiving end so as to reshape the transmitted PCM signal in order that the receiving end can receive the PCM signal having waveforms of high fidelity, i.e., having waveforms quite similar to that of the original signal. The PCM regenerative repeater is as diagrammatically illustrated in FIG. 1 of the drawings. The repeater includes an equalization amplifier 1 for amplifying and equalizing or reshaping the incoming pulse train, a timing extracting circuit 2 having a retiming function which is coupled to said amplifier so as to extract the timing information from the output code pulse series of said amplifier 1 and to form a timing signal relating to said output code signal and which is similar in some respects to that described in applicant's co-pending U.S. application Ser. No. 361,581 now U.S. Pat. No. 3,854,010 filed May 18, 1973, entitled "A Time Division Multiplexing Transmission System" and assigned to the assignee of the present invention, especially by reference to the description from page 65, line 12 to page 66, line 1 and the block 275 in FIG. 23, and a level identifying circuit 3 having a PCM pulse regeneration function, i.e., to which the output signal from said amplifier 1 is applied to be sampled by said timing information as a sampling pulse, in which the level of the sampled signal is identified whether the sampled value exceeds a given value or not so as to regenerate the reshaped pulses which are transmitted toward the receiving end and which is similar in some respects to that described in said U.S. application Ser. No. 361,581, now U.S. Pat. No. 3,854,010 especially by reference to the description from page 48, line 26 to page 50, line 7 and FIG. 18.

In such a communication system utilizing the regenerative repeater, if the transmission line has the low cut-off frequency characteristic, then the average d.c. level of the PCM signal is varied, as mentioned above, and accordingly, the zero level of the d.c. component in the input signal of said level identification circuit 3 is relatively different in point of waveform from that of the signal shape at the transmitting end. Thus, there occurs code error at the output of the level identification circuit 3. In such known devices, in order to eliminate code error, employed are a first method for balancing d.c. components with a code formation having redundancy in the direction of the amplitude of a code signal (for example, by transmitting a four-level code with five levels), a second method for restoring the d.c. component by peak-clamping wherein the code pulses have redundancy in the direction of the time axis so as to insert clamp pulses in the series of said pulses and so on.

Examples of known code formations embodying the first method are the PST (Paired Selected Ternary) code, symmetric or balanced pseudo-ternary code, symmetric or balanced multi-level code, and so on. By using such a code formation, the influence of the low cut-off frequency characteristic of the transmission line can be eliminated, however, the configuration of a decoder circuit at the receiving end is remarkably complicated because of the special code formation. In addition, due to the redundancy in the direction of amplitude of the code signal, this method has a drawback from the standpoint of the S/N ratio necessary for maintaining the code error rate at a given value.

In the case of a signal having a PCM signal only, the d.c. component can be easily balanced by said first method, whereas in the case of a composite signal having a PCM signal and a further signal such as a composite signal having the frame of a picture signal in the form of an analogue signal and the frame of an audio signal affixed to said picture signal in the form of a PCM signal and both of which frames are transmitted alternately, for example in a still picture transmission system described in said U.S. application Ser. No. 361,581, now U.S. Pat. No. 3,854,010 especially by reference to the description from page 23, line 18 to page 24, line 1, the former method cannot be adopted, since the signal level is varied when transmitting the analogue signal.

Therefore, in order to perform the d.c. restoration in such a composite signal, the second method of peak-clamping is employed, in which clamping pulses are inserted in the PCM pulse series so as to clamp the peak of the clamping pulses.

FIG. 2 shows an arrangement of a PCM regenerative repeater of the prior art in which the d.c. component is restored by peak-clamping so as to identify and to reproduce the transmitted original signal. In FIG. 2, a peak clamping circuit 4 is inserted between the preceding equalization amplifier 1 and the following timing extracting circuit 2 and the following level identifying circuit 3. The circuit arrangement of said peak clamping circuit 4 for d.c. restoration is a conventional circuit, as shown in FIG. 3, which comprises a diode D1 and a capacitor C1. In FIG. 3, the signal from the equalization amplifier 1 is applied to an input terminal In connected to the capacitor 3, the other terminal of which is coupled to a reference voltage $E_s$ through the diode D1. An output Out is derived from the common connecting point of the capacitor C1 and the diode D1. If the signal having clamp pulses and applied to said input In exceeds the clamp level corresponding to the fixed voltage $E_s$, the diode D1 conducts to discharge (or charge) said capacitor C1 with a small time constant so as to restore the d.c. component.

In case that the waveform of the code signal is a NRZ (Non-Return-to-Zero) pulse, and that there provides no level limitation in the pulse series, if the pulse series continues with the pulses without there existing any zero level pulses, then a sag of a relatively long period occurs in the pulse series due to the low cut-off frequency characteristic of the transmission line. In order to prevent the occurrence of said sag, a reference signal representative of a zero level is inserted into the PCM signal at a relatively long period so as to clamp that zero level, as shown in FIG. 4a. In FIG. 4a, a signal $a$ illustrates said reference signal having a zero level at such a period as being able to neglect said sag in the signal waveform. The insertion period of this reference signal $a$ is usually equal to one PCM frame period. In FIG. 4a, other signals $b$ and $c$ illustrate a frame synchronizing signal and a four-level PCM signal, respectively. FIG. 4b shows a clamping pulse used to form said reference signal $a$.

According to this transmission system, the decoding can be processed easily at the receiving end because a special coding system is not used. However, this transmission system has the following defects. First of all, if the noise $n$ is superimposed on the PCM signal as shown in FIG. 5, the signal is clamped at the peak point $a'$ of the noise component, so that the restored d.c. level $a$ of the code signal is raised by the amplitude of the noise $n$. This rise in the d.c. level deteriorates the code error rate. Another defect is the possibility of the considerable variation of an average level of the signal series in case there is no level limitation in the signal series. That is, in the peak clamping circuit 4 shown in FIG. 3, the ratio $r_b/r_f$ between the backward resistor $r_b$ of the diode D1 (shown as the dotted line in FIG. 3) and the forward resistor $r_f$ of the diode D1 is finite, so that the restored d.c. level is varied in accordance with the ratio $r_b/r_f$ in the case of the signal waveform having continuous parts of any given level. This variation of the d.c. level deteriorates the code error rate.

As a result, it clearly seems to be advantageous to use a pulse clamping process, for example employed in the processing of the television signal. In the pulse clamping system, the reference level of a PCM signal is clamped in the form of pulse, so that it is necessary to produce the clamping pulse having a period corresponding to that of the reference level. In the case of the television signal, the clamping pulse can easily be produced by separating the synchronizing signal from the television signal by identifying the amplitudes of the television signal. On the contrary, when introducing the pulse clamping process to the PCM signal, there occurs the following contradictory difficulty. Namely, in order to produce the clamping pulse, it is necessary to detect the synchronizing signal firstly, and in order to detect the synchronizing signal, it is required to identify the level of a code signal prior to the detection of the synchronizing pulse. However, in order to derive a pulse having an accurate level required for identifying the code signal, it is necessary to restore a d.c. component of said code signal. Accordingly, if the pulse clamping is adopted to the transmission of a code signal, the relation goes round and round in circles as described above and it is difficult to realize the d.c. restoration only by using the pulse clamping.

SUMMARY OF THE INVENTION

The present invention has for its object to improve the process of the d.c. restoration in the transmission of a multi-level PCM signal so as to transmit the original PCM signal with high fidelity to the receiving end by defeating the abovementioned disadvantages.

It is another object of the invention to provide a novel multi-level code transmission system, wherein the d.c. component of the transmitted code signal can be restored in such a way that the level of the code signal can be identified with high reliability.

It is further another object of the invention to provide a novel system for clamping a signal level which is advantageously available when reproducing a multi-level PCM signal at the receiving end.

Briefly, these objects are obtained with both peak-clamping and pulse-clamping which are employed before and after establishing synchronization at the receiving end, respectively.

More specifically, to achieve these objects, the present invention provides a multi-level code transmission system which comprises, at a transmitting end, means for producing a code signal in which a synchronizing signal and a reference signal representative of a reference level are inserted at a fixed period and means for transmitting said code signal to a receiving end, and, at the receiving end, means for receiving said code signal, mens for restoring a d.c. component of the received signal by peak-clamping the peak of the received synchronizing signal to a fixed level so as to establish the synchronization of the receiving end prior to an establishment of synchronization at the receiving end, and means for restoring a d.c. component of the received signal by pulse-clamping the reference level of a following received signal to the fixed level after said establishment of synchronization by using a clamping pulse related to the synchronizing signal.

BRIEF DESCRIPTION OF THE DRAWINGS

The present invention will be completely understood by reference to the following detailed description, taken in conjunction with the accompanying drawings, in which:

FIG. 1 is a block diagram showing a conventional PCM regenerative repeater to which reference has already been made in the discussion of the prior art;

FIG. 2 is a block diagram showing another conventional PCM regenerative repeater to which reference has also been made;

FIG. 3 shows a circuit arrangement of a known peak clamping circuit in FIG. 2;

FIGS. 4a and 4b illustrate waveforms in the case of peak clamping shown in FIG. 2 to which explanation has already been made;

FIG. 5 illustrates a waveform in which noises are superposed on the PCM signal and to which explanation has also been made;

FIG. 6 is a block diagram of an embodiment of a d.c. restoring portion of a receiver according to this invention;

FIG. 7 shows a circuit arrangement embodying the clamping circuit in FIG. 6;

FIGS. 8a, 8b, 8c and 8d illustrate waveforms for explaining the d.c. restoration according to this invention;

FIGS. 9a and 9b illustrate waveforms of the synchronizing signals together with the transmitted signal in video and audio frame periods in the still picture transmission system; and FIG. 10 is a block diagram of an embodiment of a d.c. restoring portion of a receiver in the still picture transmission system to which portion is applied this invention.

DESCRIPTION OF PREFERRED EMBODIMENTS

Referring to the drawings, there is shown in FIG. 6 a preferred d.c. restoring circuit arrangement embodying the present invention. In FIG. 6, blocks corresponding to those already shown in FIG. 1 are denoted by the same reference numerals. Reference numeral 5 denotes a clamping circuit for restoring a d.c. component, an embodiment of which will be explained in detail hereinafter with reference to FIG. 7. The input code signal is applied to this clamping circuit 5, the clamped output from which is applied to the timing extracting circuit 2 and the level identifying circuit 3. The output signal having the level identified signal from said circuit 3 is applied to a PCM frame synchronizing circuit 6 together with the timing output signal from said circuit 2 so as to reproduce the pulse frame synchronizing signal of the input PCM signal. The PCM frame synchronizing circuit 6 is similar in some respects to that described in said U.S. application Ser. No. 361,581 now U.S. Pat. No. 3,854,010, especially by reference to the description from page 66, line 2 to page 68, line 7 and the block 277 in FIG. 23. To said clamping circuit 5 is connected a conventional inhibit gate circuit 7 to which is provided a clamping pulse CLP and an inhibit pulse INH for blocking the clamping circuit 5 prior to the establishment of the frame synchronization.

The clamping circuit 5 may be arranged as shown in FIG. 7, in which the clamping circuit 5 comprises a capacitor C2, a diode D2 connected in parallel with said capacitor C2, and two transistors T1 and T2 arranged in opposite polarities to one another. The fixed voltage $E_s$ is applied to the diode D2, which is the same as the diode D1 in the peak clamping circuit shown in FIG. 3. The clamping pulse from said inhibit gate circuit 7 is applied through a capacitor C3 directly to one of said transistors, for example T1, and also through a capacitor C4 and a conventional inverter INV to the other transistor, for example T2. Prior to the establishment of frame synchronization, the clamping pulse is not applied to the clamping circuit 5 because of the inhibition by said inhibit gate circuit 7, so that the clamping circuit 5 acts as a peak clamping circuit and corresponds to the circuit 4 of FIG. 3. After having established the frame synchronization, the clamping pulse is applied to the clamping circuit 5 from said inhibit gate circuit 7, so that the clamping circuit 5 acts as a pulse clamping circuit triggered by said clamping pulse. Hence, the clamping circuit 5 has two functions of peak and pulse clampings in an incorporated manner.

Now, the operation of the circuit arrangement shown in FIGS. 6 and 7 will be explained with reference to FIGS. 8a – 8d. FIGS. 8a and 8c correspond to the waveforms of peak clamping and FIGS. 8b and 8d correspond to the waveforms of pulse clamping. FIGS. 8a and 8b illustrate waveforms without noise, and FIGS. 8c and 8d illustrate waveforms having noise n.

First, explanation is made in the case where there is no noise in the input PCM signal transmitted to the receiving end.

At the beginning of receiving the transmitted PCM signal, the frame synchronization is not confirmed, so that the output signal INH from said PCM frame synchronizing circuit 6 in FIG. 6 has a logic level "1" representative of being out of synchronization. This "1" level signal INH interrupts said inhibit gate circuit 7. Accordingly, the clamping pulse CLP is not applied to the bases of said transistors T1 and T2 in the clamping circuit 5 shown in FIG. 7, as a result of which these transistors T1 and T2 are blocked.

Under this circuit condition, the clamping circuit 5 operates as a peak clamping circuit composed of the capacitor C2 and the diode D2 receiving the fixed voltage $E_s$, and this circuit 5 clamps the peak of the received synchronizing signal to a fixed value. That is, if the forward voltage drop across the diode D2 is $E_D$, both the levels of the reference signal a inserted at the period of the pulse frame synchronizing signal and the portion having said reference level in the code signal are clamped to a level $E_s-E_D$. As a result, the identifying level is relatively shifted by the value $E_D$. But, this level shift does not affect in a bad manner establishment of the frame synchronization so long as the value $E_D$ is less than one half of the amplitude of the input signal, because binary signals are usually used as the frame synchronizing signal. Once the frame synchronization has been confirmed, the signal INH representative of the frame synchronization takes a logic level "0", so that the inhibit gate circuit 7 passes the clamping pulse CLP (FIG. 4b), indicative of the location of the signal having the reference level and inserted into the code signal at the period of the frame synchronizing signal, directly to the transistor T1 and via the inverter INV to the transistor T2 in the clamping circuit 5 of FIG. 7. The respective clamping pulses applied to the transistors T1 and T2 have the opposite polarities as shown in FIG. 7. Then, the clamping pulse CLP clamps said reference signal a to the fixed voltage $E_S$ at the timing of the clamping pulse CLP. Accordingly, the clamping circuit 5 of FIG. 7 operates as a pulse clamping circuit composed of the capacitor C2 and the transistors T1 and T2, since the diode D2 is normally off under such a condition. The level identifying circuit 3 is set at such identification levels that the signal levels can be correctly identified under such a condition. In the clamping circuit 5, the d.c. level restored by the peak clamping is different from that by the pulse clamping by the value $E_D$. But, the signal level can be correctly identified, because the identification level of the circuit 3 is set, for example to levels E1, E2 and E3 as shown in FIGS. 8a and 8b and said difference $E_D$ does not exceed one identification level E1.

Secondly, explanation is made in the case that noises are superposed on the input PCM signal.

Under operation of peak clamping at the beginning, the restored d.c. level increases by a level corresponding to the amplitude of the noise n. But, this raised d.c. restoration does not give any trouble for detecting the synchronizing signal since the restored d.c. level is inherently lower by the level $E_D$ in the case of peak clamping than in the case of pulse clamping so that the restored d.c. level is rather close to the normal value.

When starting the operation of pulse clamping after having established the frame synchronization, the output signal reproduced during the clamping period is fixed to the level $E_S$, so that the d.c. level of the reproduced output signal does not substantially vary.

In the clamping circuit 5 of FIG. 7 embodying this invention, both of the peak clamping and pulse clamping functions are incorporated in one circuit. Alternatively, the peak clamping circuit and the pulse clamping circuit may be separately provided in a manner that the input code signal is applied to the peak clamping circuit and the pulse clamping circuit before and after the establishment of synchronizations by changing the application of the clamping pulse. In such a case, it is necessary to adjust the operation of the two clamping circuits with referring to each other so as to coincide the reference level of one clamping circuit with that of the other clamping circuit, since there may be a case in which one reference level from a common reference voltage source is not provided, as is not the case with the clamping circuit 5 shown in FIG. 7. As to the reference level, the clamping circuit 5 of FIG. 7 is advantageous, since the common reference level $E_S$ is provided to the two kinds of clamping circuits so that there is no variation of reference level between the peak clamping and the pulse clamping except for the internal voltage drop $E_D$ of the diode D2.

The multi-level code transmission system according to this invention can be appropriately applied to the still picture transmission system such as described in the aforementioned U.S. application Ser. No. 361,581 now U.S. pat. No. 3,854,010 in a following manner.

An embodiment of a synchronizing signal utilized for transmitting the still picture with its accompanying audio PCM signal in said still picture transmission system is now illustrated in FIGS. 9a and 9b. In FIGS. 9a and 9b, BL is a blanking signal, PFP is a PCM frame pattern pulse forming a given code pattern for the PCM frame synchronization and the picture horizontal synchronization and also serving as a timing burst signal for extracting the PCM bit synchronization, as described in the aforementioned U.S. application Ser. No. 361,581, now U.S. Pat. No. 3,854,010 especially by reference to the description from page 24, line 2 to page 25, line 7 and the drawing of FIG. 7, MCC is a mode control signal representative of the position corresponding to the integer multiple of the picture horizontal synchronizing and the audio sampling periods throughout the picture signal period and the PCM audio signal period, the position of each television frame synchronization, or the like, and also serving as a control signal representative of the condition of the transmitted information signal, i.e., the picture signal period, the audio signal period and so on, as described in said U.S. application Ser. No. 361,581, now U.S. Pat. No. 3,854,010 especially by reference to the above description from page 24, line 2 to page 25, line 7 and the drawing of FIG. 7, SCB is a color sub-carrier burst signal, VS is a picture signal, and PWD is a frame pattern signal indicative of a four-level PCM audio signal. These signals BL, PFP and MCC are inserted into positions corresponding to a horizontal synchronizing signal at a period of about 63.5 $\mu$s in the picture signal transmission period, and are also inserted at a period of the audio sampling period of around 95.25 $\mu$s in the PCM audio signal transmission period. In said still picture transmission system, the horizontal synchronizing signal of the picture signal has a frequency of 15.75 KHz, and the PCM frame synchronizing signal of the PCM audio signal has a frequency of 10.50 KHz. That is to say, as is clear from FIGS. 9a and 9b, the timings of the horizontal synchronizing signal and the signal having the reference level are coincident to one another at every third period, and the timings of the PCM frame synchronizing signal and the signal having the reference level are coincident to one another at every second period. Therefore, if a frequency of the clamping pulse is substantially equal to a common measure of the horizontal synchronizing frequency of the picture signal and the pulse frame synchronizing frequency of the PCM audio signal, then the pulse clamping can be always effected during both of the picture signal and the PCM audio signal transmission periods.

A d.c. restoring portion of a receiver embodying this invention in the still picture transmission system is shown in FIG. 10. The peak clamping operation of the blocks shown in FIG. 10 before the establishment of synchronization is similar to that of the circuit shown in FIG. 6. In FIG. 10, a reference numeral 8 denotes a synchronizing circuit for the horizontal synchronizing signal of the picture signal and for the PCM frame synchronizing signal of the PCM audio signal and is similar in some respects to that described in said U.S. application Ser. No. 361,581, now U.S. Pat. No. 3,854,010 especially by reference to the description from page 51, line 8 to page 56, line 6 and the drawing of FIG. 17. The synchronizing circuit 8 receives said timing signal from the timing extracting circuit 2 and the level identified output from said level identification circuit 3 so as to reproduce the horizontal synchronizing signal HD of the picture signal, the PCM frame synchronizing signal DS of the PCM audio signal and a blocking signal INH relating to the establishment of synchronization, for example indicative of the condition wherein the synchronization has not been established. Prior to the establishment of synchronization, the blocking signal INH is applied to the inhibit gate circuit 7 to inhibit this gate 7, so that the d.c. restoration of the incoming signal is effected by peak clamping, as a result of which the synchronizing signals are detected so as to confirm the synchronization of the receiver, and after the establishment of synchronization said synchronizing signals HD and DS are produced and the blocking signal INH is terminated. The synchronizing signals HD and DS are applied to a logical AND gate circuit 9 so as to obtain a logical product of these signals HD and DS. The AND output signal thus obtained has a frequency equal to a common measure of these two synchronizing signals, for example 5.25 KHz in this case. The AND output signal is applied to a pulse reshaping circuit 10 from which a clamp pulse is derived. This clamp pulse is supplied to the inhibit gate circuit 7, the same as that in FIG. 6. The operation from now on in FIG. 10 is quite similar to that in FIG. 6.

In the still picture transmission system, it is not always necessary to use such a clamping pulse as having the frequency equal to said common measure. The arrangement of FIG. 10 may be modifed in such a way that a clamping pulse having a frequency of the horizontal synchronizing signal and a clamping pulse having a frequency of the PCM frame synchronizing signal are alternately applied to the clamping circuit 5 during the horizontal synchronizing signal and the PCM audio signal transmission periods, respectively, according to the detected result whether the transmitted signal is the picture signal or the PCM audio signal.

In the above embodiments of the invention the code signal transmission system according to the invention has been explained for transmitting still pictures and their related sounds in a time division mode. However, the transmission system according to the invention is not limited to such a still picture and sound transmission system, but may be used to transmit television pictures and facsimile signals. In such a case, a horizontal synchronizing signal frequency of the video signal may be selected to 15.75 KHz and a sampling frequency of the facsimile signal may be set to 31.5 KHz. In the same manner, the transmission system of the invention may be used to transmit various signals such as a remote control signal, audio signals, and facsimile signals in the form of PCM, PPM, PWM or PAM signal. In addition, it will now be apparent to those skilled in the art that changes and modifications may be made without departing from the invention in its broader aspects, and it is the intention, therefore, in the appended claims to cover all such changes and modifications as fall within the true spirit of the invention.

Advantageous effects of the multi-level code transmission system according to the invention may be summarized as follows. That is, the invention is based on the recognition of the fact that the synchronizing signal can be easily detected because this signal is usually inserted in the form of a binary signal having periodicity. On the basis of this recognition, according to the invention, prior to the establishment of synchronization, the synchronizing signal is accurately detected so as to form the clamping pulse by the d.c. restoration effected by the peak clamping which has a rather low quality but a simple pulse formation, and after the establishment of synchronization the d.c. restoration of high quality can be effected by the clamping pulse thus formed, so that the reference level of the multi-level PCM signal, the level of which must be identified very accurately. As a result, according to this invention, the d.c. restoration of high grade can be effected by means of the simple circuit configuration in the PCM signal transmission system of broadcasting, particularly in the still picture transmission system for transmitting the PCM signal together with the analogue signal such as a picture signal, so that the level variation of the received signal due to the low cut-off frequency characteristic of the transmission line can be compensated satisfactorily. Therefore, according to the invention, it is not necessary to employ any special code formation, as a result of which at the receiving end the received code signal can be decoded in a conventional manner, the same as the decoding of the known signal transmission system.

What is claimed is:

1. In a multi-level code transmission system in which a code signal, having a frame synchronizing signal and a reference signal representative of a reference level inserted in the code signal at a fixed period, is transmitted, a receiver for receiving said code signal, wherein said receiver comprises:
    first means for initially restoring a d.c. component of the received signal by peak-clamping the peak of the received synchronizing signal to a fixed level;
    means for establishing the synchronization of the receiver with respect to the received signal having a d.c. component restored;
    second means for then restoring a d.c. component of the received signal by pulse-clamping the reference level of the received signal to said fixed level by means of a clamping pulse synchronized to the received signal; and
    means for enabling said first or second means for restoring according to whether or not the synchronization of the receiver is established.

2. A receiver as claimed in claim 1 wherein said first and second means for restoring include a clamping circuit for clamping the reference level of the received code signal to said fixed level;
    said means for establishing includes a timing extracting circuit coupled to said clamping circuit and producing a timing signal synchronizing with the received code signal, a level identifying circuit coupled to said clamping circuit and identifying the level of the received code signal and producing a level identifying output signal, and a frame synchronizing circuit for receiving said timing signal from said timing extracting circuit and the level identifying output signal from said level identifying circuit and for reproducing the frame synchronizing signal of the code signal so as to produce a clamping pulse synchronizing with said reproduced frame synchronizing signal and a blocking signal prior to the establishment of synchronization; and
    said means for enabling includes an inhibit gate circuit for receiving said clamping pulse and said blocking signal from said frame synchronizing circuit and for controlling the supply of said clamping pulse to said clamping circuit by said blocking signal.

3. A receiver as claimed in claim 2, wherein said clamping circuit comprises:
    a peak clamping circuit to which the received code signal is applied prior to the establishment of synchronization of the receiver so as to clamp the peak of said code signal to said fixed level; and
    a pulse clamping circuit to which said code signal is applied after the establishment of synchronization of the receiver so as to clamp the reference level of said code signal to said fixed level at the timing of said clamping pulse.

4. A receiver as claimed in claim 2 wherein said clamping circuit comprises:
    a capacitor to which the code signal is applied;
    a diode coupled in parallel to said capacitor and receiving said fixed level; and
    two transistors coupled in parallel and in opposite polarities to one another, and one of said transistors receiving directly said clamping pulse whereas the other transistor receives an inverted signal of said clamping pulse.

5. A receiver as claimed in claim 2 for a multi-level code transmission system in a still picture transmission system in which an analogue picture signal and a PCM audio signal are transmitted alternately, wherein a frequency of said clamping pulse is substantially equal to a common measure of a horizontal synchronizing frequency of said picture signal and a pulse frame synchronizing frequency of said PCM audio signal.

6. A receiver as claimed in claim 1 for a multi-level code transmission system in a still picture transmission system in which an analogue picture signal having a horizontal synchronizing signal and a PCM audio signal having a pulse frame synchronizing signal and a reference signal representative of a reference level are transmitted alternately, wherein
    said first and second means for restoring include a clamping circuit, responsive to said picture signal and said PCM audio signal, for clamping the reference level of the PCM signal to said fixed level;
    said means for establishing includes a timing extracting circuit coupled to said clamping circuit and producing a timing signal relating to the PCM signal, a level identifying circuit coupled to said clamping circuit and identifying the level of said PCM signal and producing a level identifying output signal, and a synchronizing circuit for receiving said timing signal from said timing extracting circuit and the level identifying output signal from said level identifying circuit and reproducing the horizontal synchronizing signal of said picture signal and the pulse frame synchronizing signal of said PCM audio signal and producing a blocking signal prior to the establishment of synchronization; and said means for enabling includes a logical AND gate circuit for receiving said horizontal and pulse frame synchronizing signals to produce a logical product thereof which has a frequency equal to a common measure of said synchronizing signals, a pulse reshaping circuit for reshaping said logical product so as to produce a clamping pulse, and an inhibit gate circuit for receiving said clamping pulse and said blocking signal so as to control the supply of said clamping pulse to said clamping circuit by said blocking signal.

7. In a multi-level code transmission system in which a code signal, having a frame synchronizing signal and a reference signal representative of a reference level inserted in the code signal at a fixed period, is transmitted, a receiver for receiving said code signal wherein said receiver comprises:

first means for restoring a d.c. component of the received signal by peak-clamping the peak of the received synchronizing signal to a fixed level so as to establish the synchronization of the receiver prior to an establishment of synchronization and reproduction of the synchronizing signal in the receiver; and second means for restoring a d.c. component of the received signal by pulse-clamping the reference level of a following received signal to said fixed level after said establishment of synchronization at the timing of a clamping pulse synchronizing with the reproduced synchronizing signal, wherein said first and second restoring means include a clamping circuit for clamping the reference level of the received code signal to said fixed level;

a timing extracting circuit coupled to said clamping circuit and producing a timing signal corresponding to the received code signal;

a level identifying circuit coupled to said clamping circuit and identifying the level of the received code signal and producing a level identifying output signal;

a frame synchronizing circuit for receiving said timing signal from said timing extracting circuit and the level identifying output signal from said level identifying circuit and for reproducing the frame synchronizing signal of the code signal so as to produce the clamping pulse synchronizing with said reproduced frame synchronizing signal and a blocking signal prior to the establishment of synchronization; and an inhibit gate circuit for receiving said clamping pulse and said blocking signal from said frame synchronizing circuit and for controlling the supply of said clamping pulse to said clamping circuit by said blocking signal.

8. A receiver as claimed in claim 7, wherein said clamping circuit comprises:

a peak clamping circuit to which the received code signal is applied prior to the establishment of synchronization of the receiver so as to clamp the peak of said received code signal to said fixed level; and a pulse clamping circuit to which said received code signal is applied after the establishment of synchronization of the receiver so as to clamp the reference level of said received code signal to said fixed level at the timing of said clamping pulse.

9. A receiver as claimed in claim 7, for a multi-level code transmission system in a still picture transmission system in which an analogue picture signal and a PCM audio signal are transmitted alternately, wherein a frequency of said clamping pulse is substantially equal to a common measure of a horizontal synchronizing frequency of said picture signal and a pulse frame synchronizing frequency of said PCM audio signal.

* * * * *